United States Patent
Glanville et al.

[11] Patent Number: 5,453,976
[45] Date of Patent: Sep. 26, 1995

[54] AUDIO SIGNAL PROCESSOR CIRCUIT

[75] Inventors: Derek N. Glanville, Cirencester; Robin A. Emley, Prescot, both of United Kingdom

[73] Assignees: GPT Limited; Plessey Semiconductors Limited, both of United Kingdom

[21] Appl. No.: 793,399
[22] PCT Filed: May 15, 1990
[86] PCT No.: PCT/GB90/00747
   § 371 Date: Mar. 6, 1992
   § 102(e) Date: Mar. 6, 1992
[87] PCT Pub. No.: WO91/18453
   PCT Pub. Date: Nov. 28, 1991
[51] Int. Cl.$^6$ .................................................. H04B 3/23
[52] U.S. Cl. ........................................ 370/32.1; 379/410
[58] Field of Search ................... 370/32, 32.1; 375/8, 375/16; 379/410, 411, 398, 406; 340/827

[56] References Cited

U.S. PATENT DOCUMENTS

| | | | |
|---|---|---|---|
| 3,732,410 | 5/1973 | Mackechnie | 379/406 |
| 3,789,165 | 1/1974 | Campanella et al. | 370/32.1 |
| 4,024,358 | 5/1977 | Virupaksha | 370/32.1 |
| 4,071,903 | 1/1978 | Head et al. | 364/728.04 |
| 4,270,026 | 5/1981 | Shenoi et al. | 370/118 |
| 4,334,128 | 6/1982 | Snijders | 379/406 |
| 4,562,312 | 12/1985 | Duttweiler | 370/32.1 |
| 4,577,309 | 3/1986 | Barazeche et al. | 370/32.1 |
| 4,621,172 | 11/1986 | Kanemasa et al. | 370/32.1 |
| 4,707,824 | 11/1987 | Kanemasa | 370/32.1 |
| 4,760,596 | 6/1988 | Agrawal et al. | 370/32.1 |
| 5,062,102 | 10/1991 | Taguchi | 370/321 |

FOREIGN PATENT DOCUMENTS

WO82/03144  9/1982  WIPO.

OTHER PUBLICATIONS

P. Geisler, "Digitaler Vorzeichenkorrelator", Oct., 1985, pp. 113–114.

Primary Examiner—Douglas W. Olms
Assistant Examiner—Huy D. Vu
Attorney, Agent, or Firm—Kirschstein, Ottinger, Israel & Schiffmiller

[57] ABSTRACT

An audio processor circuit for treating a digitally encoded incoming signal, the circuit comprising circuitry (3, 12) for sampling the encoded signal at two or more sample frequencies, circuitry (8, 13, 38, 40, 46) for calculating from the sampled values a cross-correlation function relevant to a particular time frame, the value of said function serving to control operation of an adaptive algorithm, in which the sampled signal portions are truncated (2, 5) such that only the arithmetic sign bit of each signal portion contributes to the function calculation.

7 Claims, 6 Drawing Sheets

SCHEMATIC OF A SUITABLE DC BLOCKING FILTER (PRIOR ART)

1

AUDIO SIGNAL PROCESSOR CIRCUIT

BACKGROUND OF THE INVENTION

1. Field of the Invention

This invention relates to an audio signal processor circuit for treating the signals from a telephone subscriber's line when these have been received at the telephone exchange, and converted to sampled digital form.

2. Description of Related Art

In a telephone exchange, the signals on the telephone subscriber's line usually in analogue form and are converted from analogue to digital form by a sampling and coding operation performed by an audio processor circuit. The impedances which are presented by each individual telephone line at any particular time are likely to give an impedance mismatch and this can cause a 2-to-4 wire hybrid echo signal to appear. It is possible for at least part of this echo effect to be cancelled digitally in the audio processor unit. The echo cancellation operation may be static, that is, its operation will be pre-set by the manufacturer of the circuit at some compromise impedance matching value. Alternatively, the echo cancellation could be designed to work by a process of continuous adaption to minimise the echo signal.

If sinusoidal signals happen to be present on the telephone line instead of speech, any adaptive operation can lead to the occurrence of further unwanted side effects in the adaption circuit output.

It is possible to overcome some of these problems by providing an adaptive echo cancellation system which can be modified in response to the statistical properties of the signal input, but a conventional adaptive system using a conventional signal correlator would need a substantial quantity of hardware for its realisation. The correlator hardware and necessary signal processing would be likely to increase significantly the area of circuit board necessary for that subscriber at the exchange. This could lead to a substantial increase in the cost of building the exchange.

SUMMARY OF THE INVENTION

An object of the present invention is to provide an audio processor circuit which can carry out an adaptive echo cancellation function with normal speech signals and which will not respond adversely to large sinusoidal signals, but which can be economical in the quantity of hardware needed.

According to the invention, there is provided an audio signal processor circuit for treating a digitally encoded incoming signal, the circuit comprising circuitry for sampling the encoded signal, means for calculating from the sampled values a measure of correlation function relevant to a particular time frame, the value of said function serving to control operation of an adaptive echo cancellation algorithm, in which the sampled signal portions are truncated such that only the arithmetic sign bit of each signal portion contributes to the function calculation.

The circuit further comprises means for controlling the operation of said adaptive algorithm at the end of each time frame for a new function calculation.

In one embodiment, incoming signal samples are initially treated in an extraction block arranged to determine the arithmetic sign of those signal samples, the resulting sign bits being fed in sequence to a shift register arranged to store a predetermined number of said sign bits.

2

BRIEF DESCRIPTION OF THE DRAWINGS

By way of example, a particular embodiment of the invention will now be described with reference to the accompanying drawings, in which.

DETAILED DESCRIPTION OF THE PREFERRED EMBODIMENTS

Figure 1:
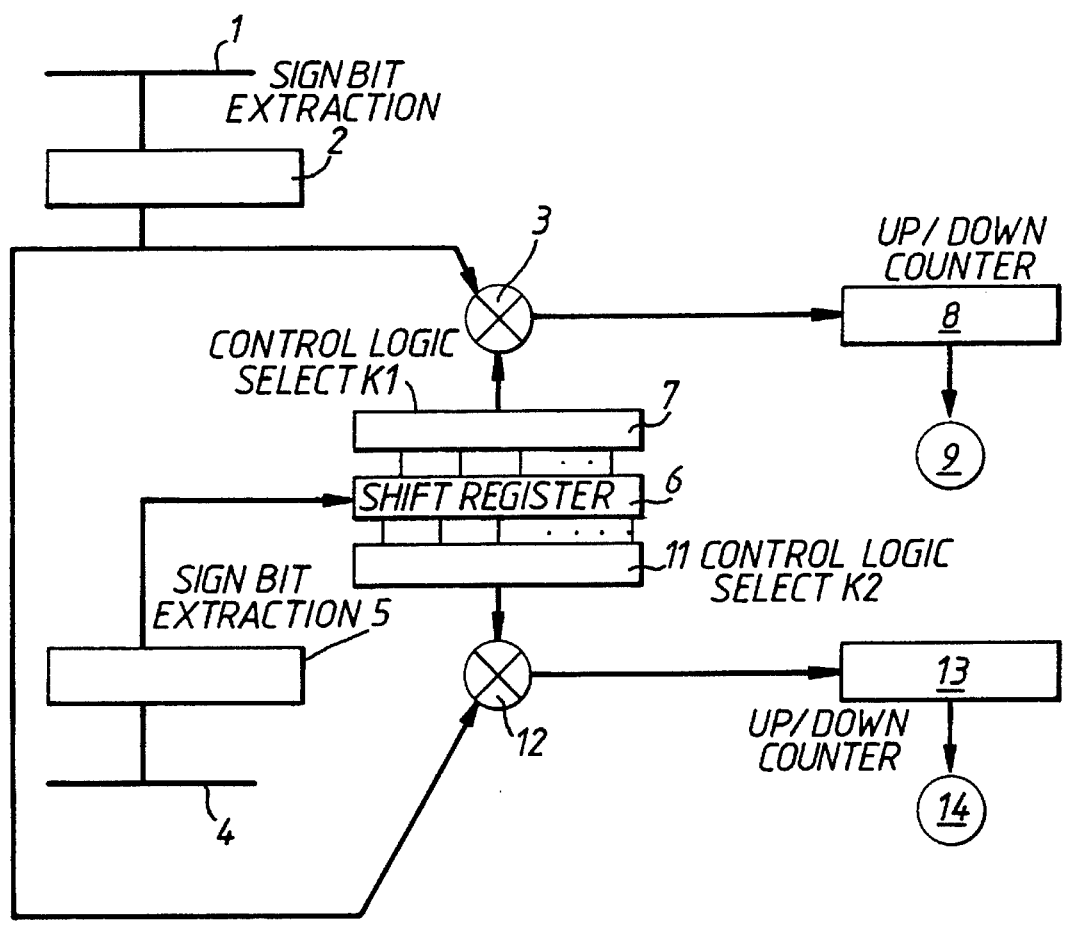
FIG. 1 is a block diagram of a correlator circuit used in the present invention.

In order to prevent an adaptive echo cancellation system exhibiting instability with sinusoidal signals, it is sufficient to estimate when two signals are both periodic and have a high degree of correlation. For the cross-correlation function, it would be helpful to produce a binary output indicating, in one state, if the signals were uncorrelated or random and correlated. In the other state, the signals would be periodic and of substantially the same periodicity. It can also be sufficient to determine if a signal transmitted in one path is sinusoidal. In this case, an auto-correlation function can be used to discriminate between sinusoidal and random signals. The auto-correlation function will be produced if two extraction blocks are connected to a common signal path.

Given two signals x and y, the cross-correlation function will have the following properties, depending on the nature of the signals. If x and y are 'uncorrelated' then by definition the cross-correlation function will be zero. If x and y are random but have some degree of correlation the cross-correlation function will have a maximum value at some point and the function will diminish to zero at points removed from the location of the maximum. If, however, the signals are sinusoidal, differing only in amplitude and phase, the cross-correlation function will be a cosinusoid of half the amplitude of the product of the amplitudes of the sinusoids.

For periodic signals, correlation functions are precisely given by the integral $$\frac{1}{T} \int_{\frac{-T}{2}}^{\frac{T}{2}} x(t) \cdot y(t+\tau) dt$$

In this expression, T is the period of the sinusoidal signal, t is time, Y is a shift in time (shifted time) and x(t) is a function of the signal x with respect to time. For a finite set of samples (sampled digital systems), this integral may be summed approximately as follows:

$$C(k) = \frac{1}{N} \sum_j X_j \cdot Y_{(j+k)}$$

In this expression, C(k) is the correlation function, N is the total number of samples, j is any one of the set of the samples from zero to the number N, K is a different one of the set of samples from zero to the number N, $X_j$ is the jth member of the set of samples of x(t).

The degree of approximation introduced by summing a finite set of samples depends on the statistics of the signals, sampling frequency and the size (N) of the set of samples used. If the signals are uncorrelated, or random but correlated, then instead of tending to zero they will tend to a small number which will 'hover' about zero. But, if the signals x and y are periodic and exhibit a high degree of correlation, the correlation function will be a close approximation to a cosinusoid even with a relatively small sample set. The conventional hardware realisation of the above summation (the correlation function) would require the provision of k shift registers of shift 1 to k, k+1 full word length multipliers, k adders and a software algorithm for determining, from the stored waveform, the nature of the signals x and v for all levels of x and v (mean square value).

The present invention serves to determine the occurrence of periodic signals from the classes of signals that can be present, and with a significant reduction in the amount of hardware necessary to achieve such determination.

If the signals x and y are replaced by their arithmetic signs (that is, by the sign +1 if the signal is greater than zero and −1 if less than zero), we can calculate an estimate of the cross-correlation function as $$\frac{1}{N} \sum_j \text{sign } [X_j] \text{ sign } [Y_{(j+k)}]$$

It will be noted that by taking the sign bits of the signal portions, this expression will be independent of the exact amplitude of the signals but, in the cases considered, the mean values of the signals are assumed to be zero.

The occurrence of periodic correlated signals can be deduced if the above summation is more negative than −0.5.

FIG. 1 shows one form that the circuit hardware can take.

As shown in FIG. 1, an x signal path 1 is connected to a first extraction block 2 by which the sign bit of an incoming digitally encoded signal is extracted and the relevant sign bit is passed to a multiplier 3. Similarly, a y signal path 4 is connected to a second extraction block 5 by which the sign bit of the signal is extracted and the relevant sign bit is passed to an M bit shift register 6 (where M≧N). In the shift register 6, the number of samples falling within a given time period T, can be given to the y value. A control logic select k1 circuit 7 takes the relevant y sign bit and passes it to the multiplier 3.

In the multiplier 3, multiplication is performed according to the following truth table to give the xy product:

| y = | −1 | +1 |
|---|---|---|
| x = −1 | +1 | −1 |
| +1 | −1 | +1 |

The output of the multiplier 3 is delivered to an up/down counter 8 which serves to sum the multiplier output over N samples. At the conclusion of the time period T, the counter values of the sign and magnitude bits are delivered to an evaluation point 9. By noting the logic output, a simple gate device is able to indicate if both the sign bit indicates a negative value and the magnitude of the output is greater than half the maximum count. The counter 8 is then cleared and the process is arranged to start again to produce a sequence of estimated values. Correlation is assumed if the sign bit is negative and the count is greater than 0.5. The signals may be assumed to be sinusoidal, and the adaptive echo cancellation may be inhibited.

As already mentioned, an auto-correlation function would be produced if both extraction blocks 2 and 5 were connected to a common signal path, that is, to either path 1 or path 4 in the diagram.

The construction just described is able to estimate the cross-correlation (or auto-correlation) function at only a single point. However, because of the periodic nature of sinusoids, it is possible to construct other values of the correlation function by simply repeating the process within a given time frame. This will therefore build up a 'sampled' correlation function. Because of a relationship that may exist between the sample frequency and the set of k-values, it may be that all values generated are greater than −0.5, thus a second set of k-values (k2) that are not numerically related to the first set (k1) should be used simultaneously.

For example, a first set k1 could result in estimation of a cross-correlation function occurring at, for example, arbitrary points 7, 14, 21 . . . , whilst a second set k2 could detect correlation at points 13, 26, 39 . . . . By choice of sample size, shift register length and knowledge of the signal bandwidth, the above process can be repeated within a particular time frame whereby a high degree of certainty of detection of the periodic signals, if these signals should exist, can be assured.

The provision of the 'sampled' correlation function is capable of being effected in the circuit shown in FIG. 1 because the shift register 6 is additionally coupled to a control logic, select-k2, circuit 11. The select-k2 circuit 11 thus passes a y sign bit selected for a different value of k to a second single bit multiplier 12. The multiplier 12 has a second input which receives a x signal sign bit from the first extract block 2 in the x signal path.

The output from the multiplier 12 is delivered to a second up/down counter 13 which serves to sum the multiplier output over N samples. At the conclusion of the count, the values of the sign and magnitude bits are delivered to a second evaluation point 14, and, if correlation exists, the adaptive echo cancellation is inhibited.

This process may be extended further, at the cost of providing additional hardware, for a third (k3), a fourth (k4) etc. set of values.

At the conclusion of the estimation period, the logic control of the adaptive echo cancellor is able to update its adaption to the echo signal improving its cancellation performance, or in the presence of large sinusoidal signals prevent further adaption and thereby avoid the unwanted side effects.

Figure 2:
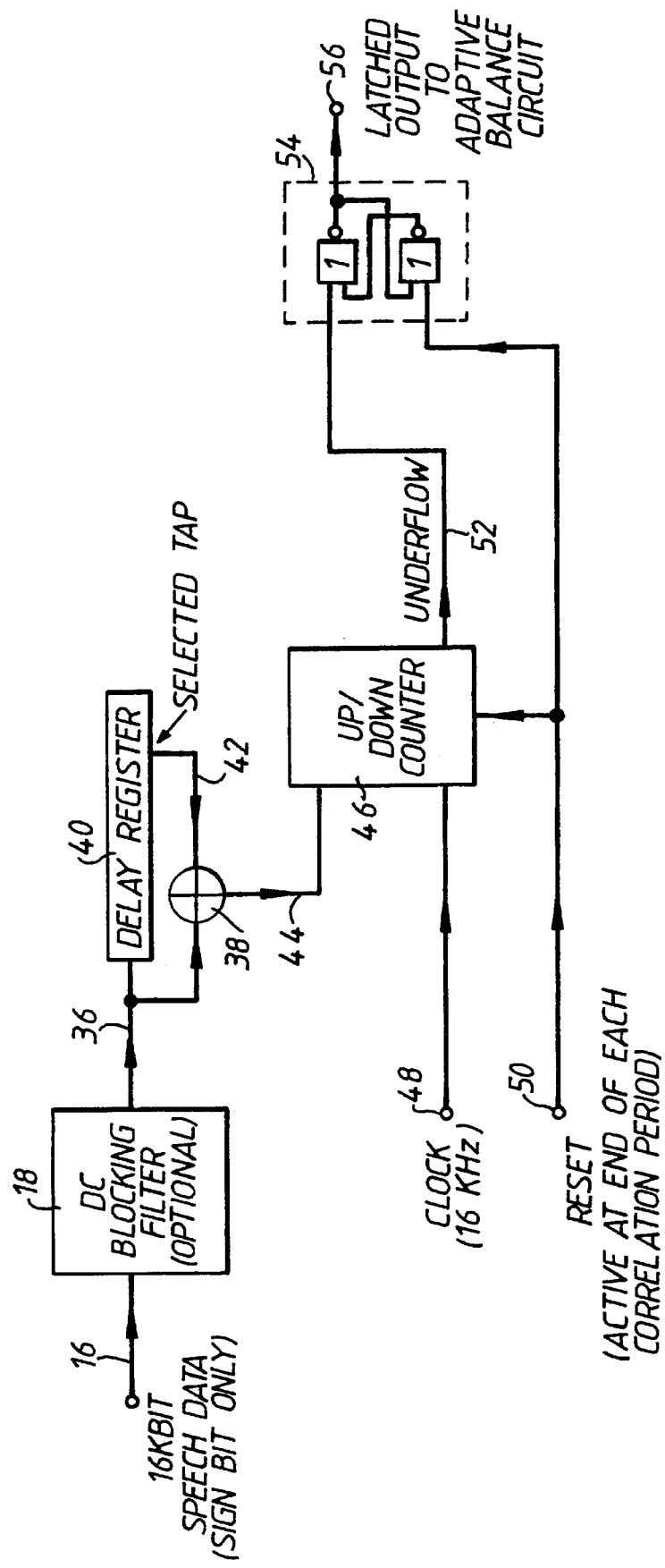
FIG. 2 is a block schematic diagram of the correlator of FIG. 1.
Figure 5:
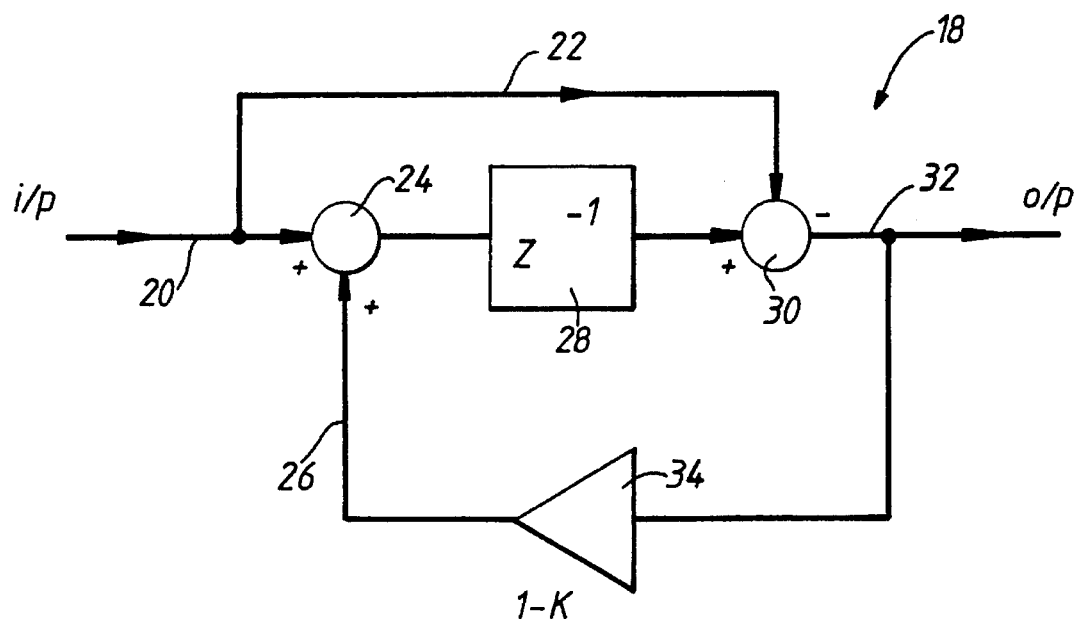
FIG. 5 is a diagrammatic representation of a DC blocking filter usable with a correlator according to the present invention.

A more practical autocorrelation block circuit diagram is shown in FIG. 2. A sampled speech signal is digitised and the sign bit only is input at 16 to a D.C. blocking filter 18. The filter 18 may be any conventional high pass filter such as that shown in FIG. 5. The filter there shown comprises an input 20, a forward feed path 22, a summer 24 whereto are fed input 20 and a feedback signal on a line 26, a delay element 28, a second summer 30 having as inputs the output of the delay element 28 and the forward feed path 22 and providing an output 32 from which is taken the feedback signal, through an amplifier 34 to the line 26.

The filter 18 strips out any D.C. offset and provides an output 36 which is fed directly to a multiplier 38 (equivalent to the multiplier 3 of FIG. 1) and to a delay register 40 (equivalent to the shift register 6 of FIG. 1). A selectable tap 42 provides a second input to the mixer 38. The output 44 of the mixer 38 is fed to an up/down converter 46 clocked at the sampling rate (16 KHz) by a clock 48. The converter 46 is reset at the end of each correlation period by reset means 50. The underflow output 52 of the counter 46 is fed to a latch 54 which is also reset by the reset means 50 to provide an output 56 to inhibit adaptive echo cancellation.

The arrangement described in relation to FIGS. 1 and 2, whilst providing considerable advantage over the known prior art, requires an increasing number of delay elements as the frequency to be detected is reduced. The FIG. 1 arrangement normally requires 2 correlators each performing, for example, 8 correlation operations per time frame. Using only negative sign and value (underflow) outputs, 12 delay elements are required to detect a sinusoidal signal of frequency 600 Hz. Mains frequency hum at 50 Hz requires 20 delay elements which increase the quantity of hardware required to effect detection.

Figure 3:
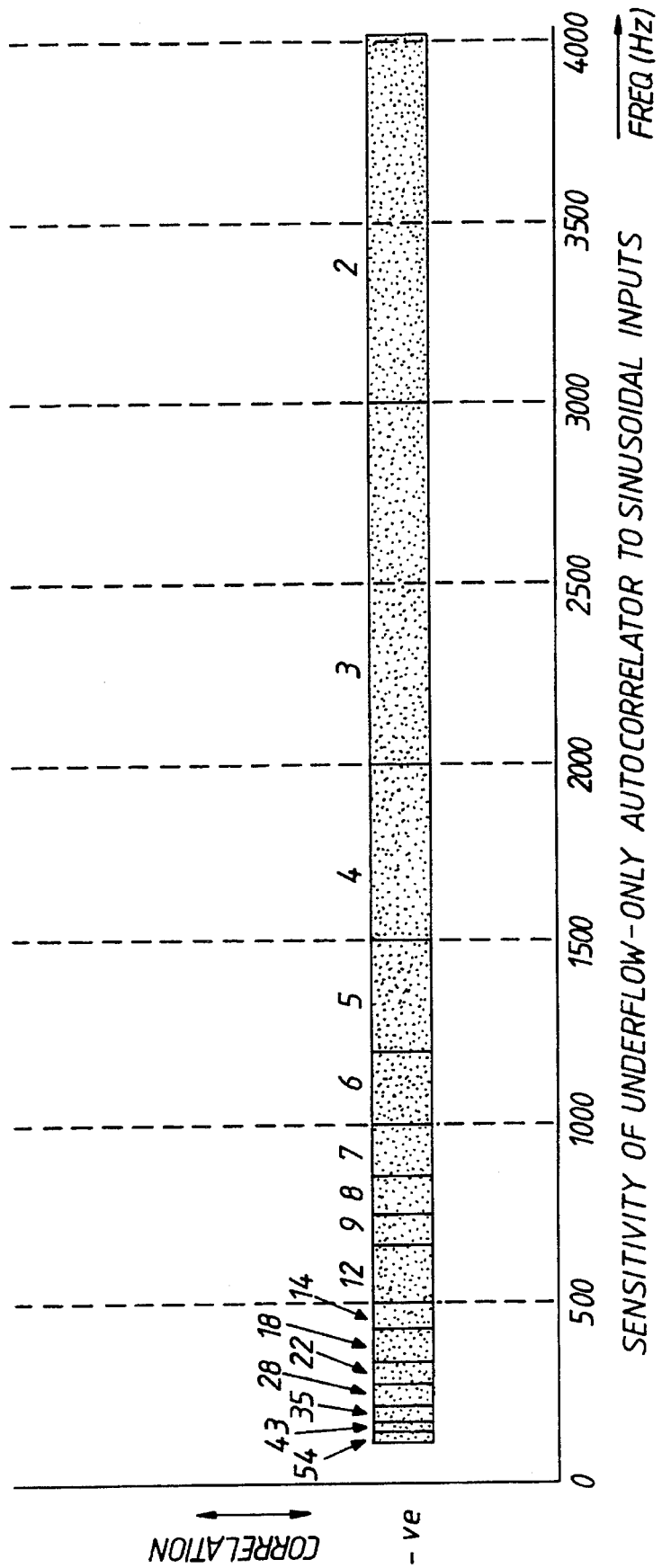
FIGS. 3 and 3A are diagrammatic representations of sensitivity of correlators, according to the present invention, to sinusoidal inputs of different frequencies.
Figure 3A:
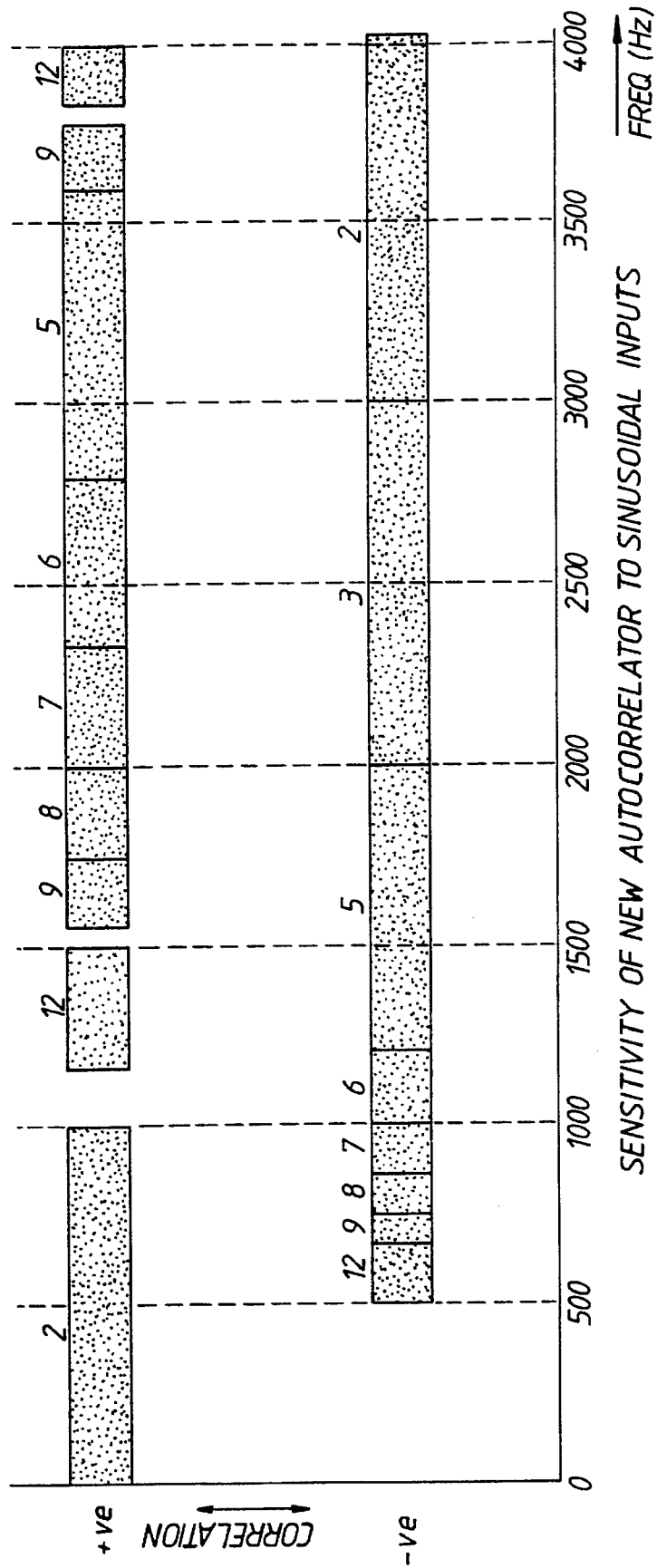

FIGS. 3 and 3A show the number of 16 KHz delay elements necessary to detect correlation if underflow (FIG. 3) or underflow and overflow (FIG. 3A) output of the counter such as the counter 46 is taken.

The underflow representations (negative sign and magnitude) shows that the number of delay elements required is inversely proportional to the frequency of the sinusoid. If a combination of underflow and overflow (negative or positive and value) is taken then the advantageously low number of delay elements (2) could be used for sinusoids up to 1000 Hz and thereafter six (or preferable eight either as a single element or two banks of four) could be used for all frequencies from zero to maximum frequency at which sinusoids cause problems.

Figure 4:
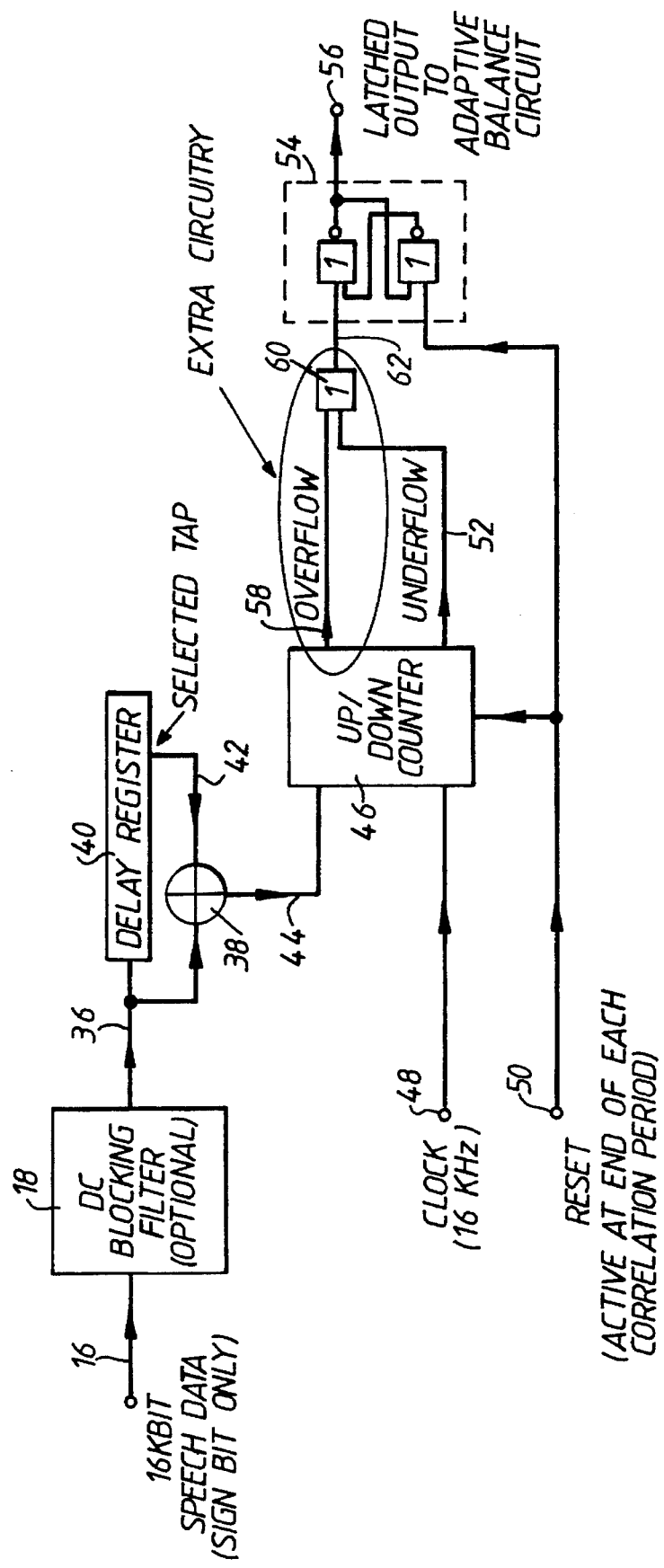
FIG. 4 is a block schematic diagram of a preferred correlator, according to the present invention.

As shown in FIG. 4, additional circuitry over that shown and described in relation to FIG. 2, is minimal. Like reference numerals have been used to indicate similar parts in these figures.

In FIG. 4, the up/down counter 46 has an overflow output 58 which is fed to one input of an OR gate 60 to the other input of which is fed the underflow 52 from the counter 46. The output 62 from the OR gate 60 is fed to the latch 54 and the output 56 is taken and used in the same way as previously.

It has been found that the hardware for the correlator circuit of the invention is capable of being built on an integrated circuit chip with only a small increase in the chip area needed over that required for the audio processor including the adaptive echo cancellor. In one embodiment, an area increase of only 3% was required to support the components needed for the correlator circuit.

The foregoing description of embodiments of the invention have been given by way of example only and a number of modifications may be made without departing from the scope of the invention as defined in the appended claims.

We claim:

1. An audio signal processor circuit for adaptive cancellation of echoes in digitally encoded incoming signals, the circuit comprising: first means for sampling encoded signals on a first path of said processor circuit to provide first sampled signal values; means for extracting from said first sampled signal values an arithmetic sign bit in respect of each first sampled signal value; second means for sampling encoded signals on a second path of said processor circuit to provide second sampled signal values; means for extracting from said second sampled signal values an arithmetic sign bit in respect of each second sampled signal value; means for calculating from the arithmetic sign bits in respect of said first and second sampled signal values a measure of a correlation function between said first sampled signal values and said second sampled signal values during a particular time frame; and means responsive to the measure of said correlation function to provide a signal for inhibiting the adaption of said echo cancellation.

2. An audio signal processor circuit for adaptive cancellation of echoes in digitally encoded incoming signals, the circuit comprising: first means for sampling encoded signals on a path of said processor circuit to provide first sampled signal values; means for extracting from said first sampled signal values an arithmetic sign bit in respect of each first sampled signal value; second means for sampling encoded signals on said path of said processor circuit to provide second sampled signal values; means for extracting from said second sampled signal values an arithmetic sign bit in respect of each second sampled signal value; means for calculating from the arithmetic sign bits in respect of said first and second sampled signal values a measure of an autocorrelation function between said first sampled signal values and said second sampled signal values during a particular time frame; and means responsive to the measure of said autocorrelation function to provide a signal for inhibiting the adaption of said echo cancellation.

3. A circuit as claimed in claim 1 or claim 2, in which an incoming signal sample on a said path of said circuit is initially treated in an extraction block arranged to determine the arithmetic sign relevant to that signal sample, and said means for calculating includes a shift register arranged to store a predetermined number of said sign bits and means for applying sign bits from said extraction block to said shift register.

4. A circuit as claimed in claim 3, wherein said means for calculating includes multiplier means and select circuit means arranged to provide outputs from selected locations in said shift register to said multiplier means.

5. A circuit as claimed in claim 4, wherein there are provided means to apply sign bits extracted from signal samples on the other of said paths of said circuit to said multiplier means; an up/down counter for accumulating the measure of said correlation or autocorrelation function; and means to apply an output from said multiplier means to said up/down counter.

6. A circuit as claimed in claim 5, wherein the up/down counter has underflow and overflow outputs providing both the sign and value of said measure.

7. A circuit as claimed in claim 1 further including latch means, reset at the end of each function calculation, for holding the arithmetic sign and value of the calculation for inhibiting or permitting operation of the adaptive echo cancellation algorithm.

\* \* \* \* \*